United States Patent [19]
Denny

[11] 3,744,178
[45] July 10, 1973

[54] FISHING SPREADER ASSEMBLY
[75] Inventor: Thomas A. Denny, Lorain, Ohio
[73] Assignee: Oberlin Canteen, Inc., Oberlin, Ohio
[22] Filed: Oct. 4, 1971
[21] Appl. No.: 186,327

[52] U.S. Cl............................... 43/42.74, 43/44.84
[51] Int. Cl............................................ A01k 91/04
[58] Field of Search.............. 43/42.74, 27.4, 44.83, 43/43.13, 43.16, 44.84, 43.12

[56] References Cited
UNITED STATES PATENTS

| | | | |
|---|---|---|---|
| 3,190,029 | 6/1965 | Bondi................................. | 43/42.74 |
| 2,683,324 | 7/1954 | Engelman.......................... | 43/42.74 |
| 3,401,483 | 9/1968 | Bellah et al.................... | 43/43.13 X |
| 2,162,739 | 6/1939 | Mindek, Jr......................... | 43/42.74 |
| 2,514,527 | 7/1950 | Verhota.......................... | 43/43.16 X |
| 2,157,003 | 5/1939 | Mussina............................. | 43/42.74 |
| 3,421,250 | 1/1969 | Krieg................................ | 43/42.74 |
| 3,105,318 | 10/1963 | Birrell.......................... | 43/42.74 X |
| 2,877,594 | 3/1959 | Birrell............................... | 43/42.74 |

FOREIGN PATENTS OR APPLICATIONS

| | | | |
|---|---|---|---|
| 36/24017 | 12/1961 | Japan................................. | 43/42.74 |
| 959,600 | 3/1950 | France............................. | 43/43.12 |

*Primary Examiner*—Hugh R. Chamblee
*Assistant Examiner*—James H. Czerwonky
*Attorney*—Carl F. Schaffer, Richard D. Emch et al.

[57] ABSTRACT

The invention is a fishing spreader having a sinker weight which engages the bottom of a body of water. A vertically movable, freely slidable float holds the upper end of the spreader above the bottom, thereby placing the hooks in a proper position adjacent the bottom. The spreader has end loops through which pass the leaders for snelled fish hooks. A keeper member is provided for each loop, and means spaced from said loops is provided for attaching each leader to the spreader assembly. The sinker weight is removable and by reversing the spreader, the hooks are positioned at a desired location adjacent the surface of the water.

7 Claims, 6 Drawing Figures

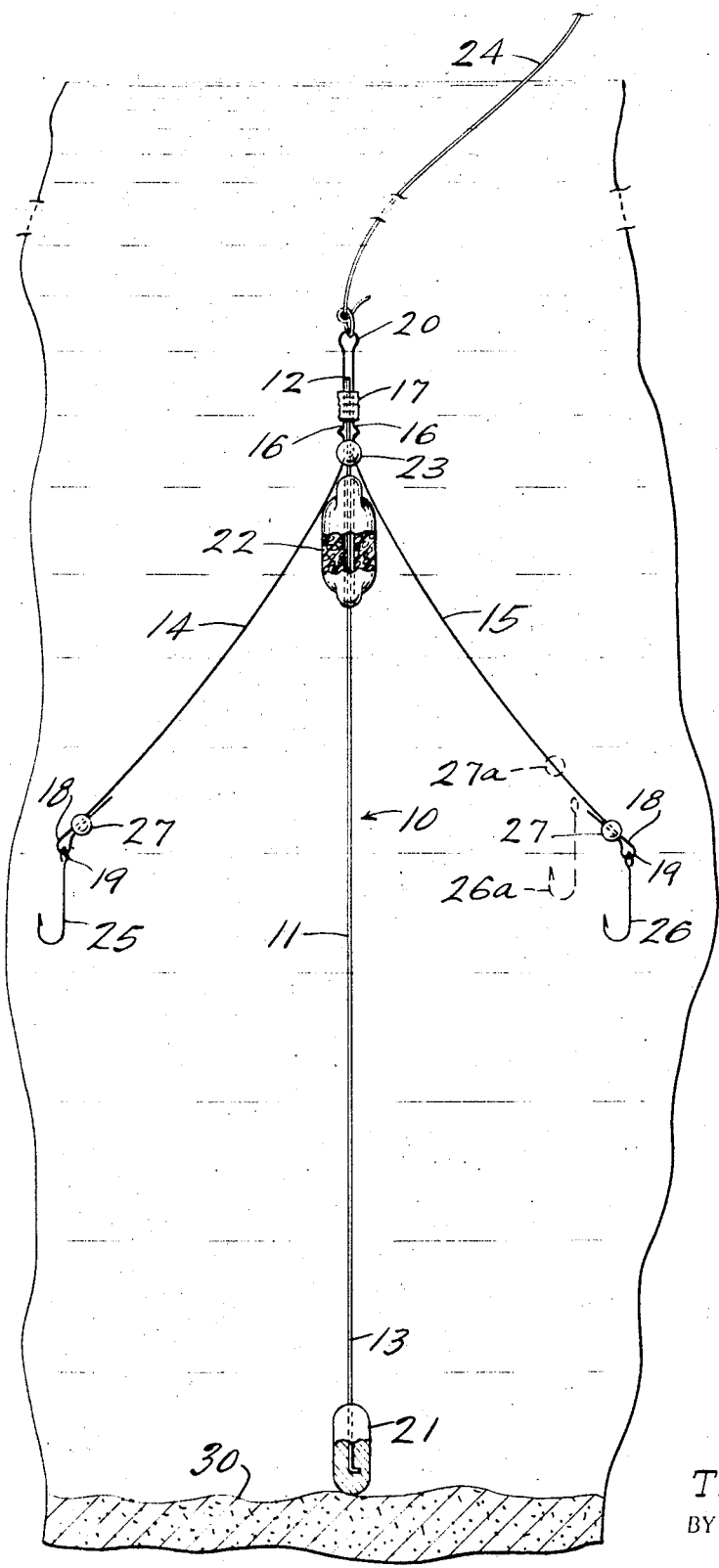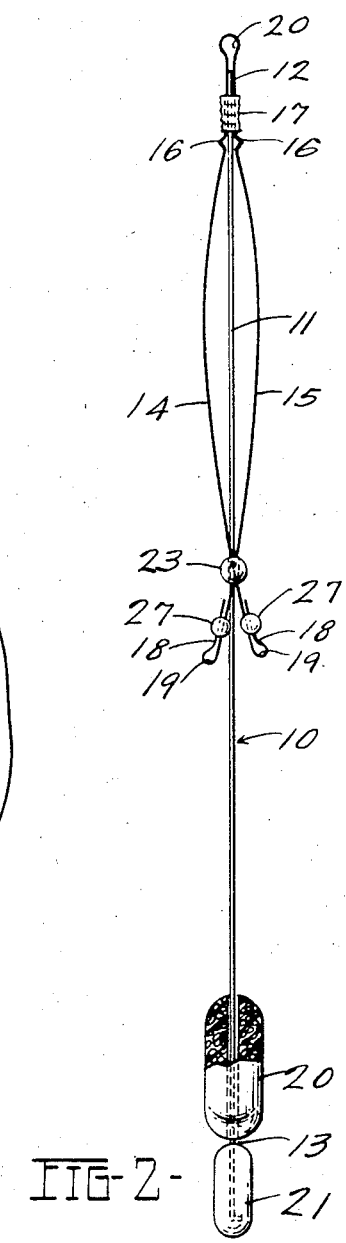
FIG-1-
FIG-2-
INVENTOR:
THOMAS A. DENNY.
BY Owen & Owen
ATT'YS.

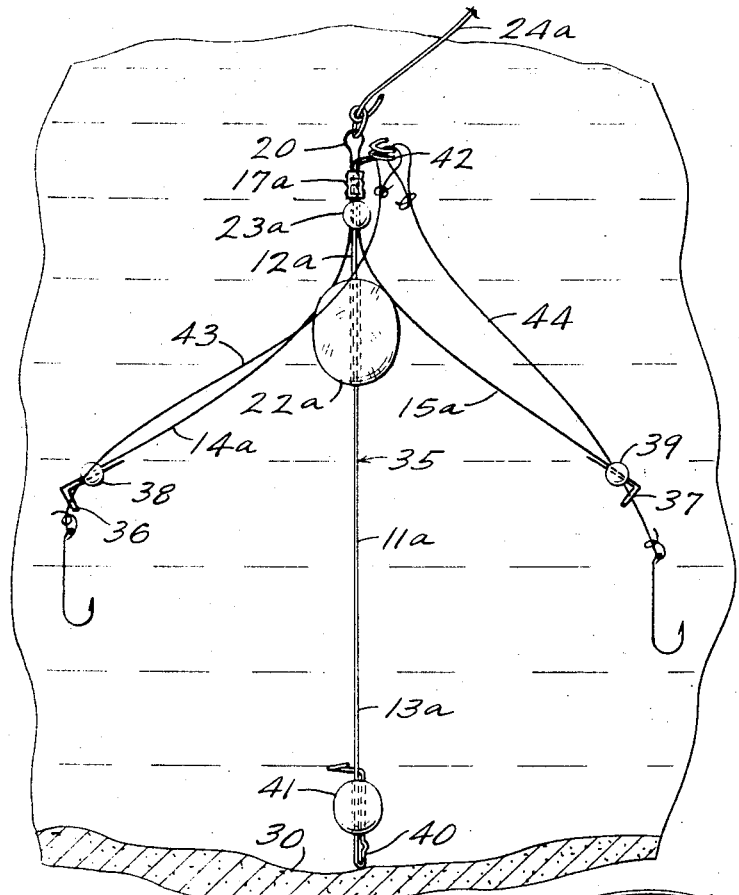
FIG-3-
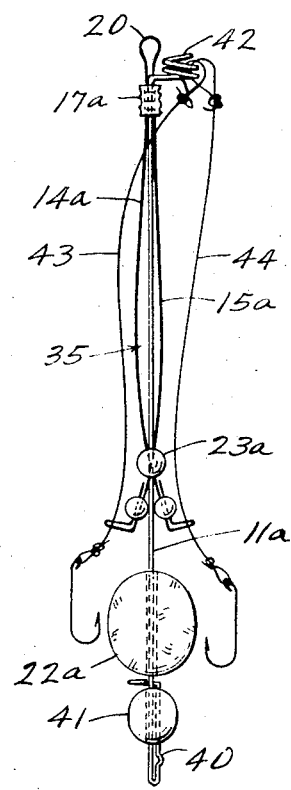
FIG-5-
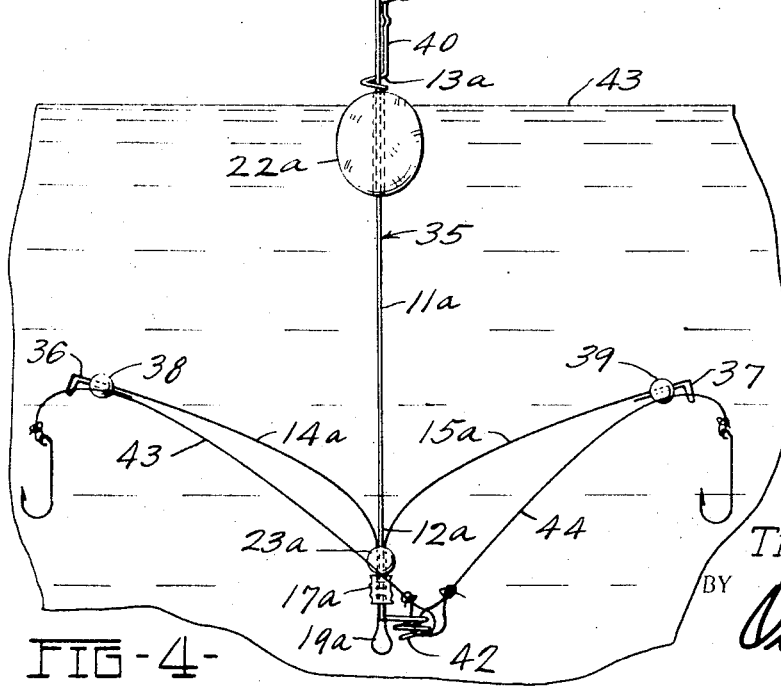
FIG-4-
FIG-6-
INVENTOR:
THOMAS A. DENNY.
BY Owen & Owen
ATT'YS.

FISHING SPREADER ASSEMBLY

BACKGROUND OF THE INVENTION

It is well known among fishermen that two items of major importance in attempting to catch fish are water temperature and depth.

Many fish, for examples perch and walleye, feed near the bottom of a body of water. To catch these fish, it is normally necessary to place the baited hooks closely adjacent the bottom, however, not on the bottom.

Fishing spreaders, whereby two or more hooks may be attached to one fishing line, are well known in the art and are, for example, used by many perch fishermen on the Great Lakes. One of the problems with many prior art spreaders is that they increase the fisherman's difficulties with respect to placing the fishing hooks adjacent the bottom. Because the spreaders add considerable weight to the line, the fisherman loses his sense of touch in sensing the bottom. Furthermore, if the fisherman is drift fishing, even though he started in a proper position with respect to the bottom, when using prior art spreaders, the elevation of the fishing hooks are often moved out of their proper position as the fisherman's boat moves and the elevation of the bottom changes.

Still another problem often encountered with prior art spreaders was the difficulty in storing such spreaders in, for example, the fisherman's tackle box.

It is the primary purpose of the presnet invention to provide an improved fishing spreader assembly which enables the fisherman to place his baited hooks at their proper vertical elevation in a body of water.

It is still another object of the present invention to provide a fishing spreader assembly which may be readily stored.

It is a further object of the present invention to provide a fishing spreader assembly which may be reversed to place the hooks adjacent the surface of a body of water.

SUMMARY OF THE INVENTION

The present invention is a fishing spreader assembly which includes a longitudinally extending metal stand having an upper end and a lower end. A pair of oppositely disposed flexible spreader arms are attached to the stand and a sinker weight is attached to the lower end of the stand. A float is slidably mounted on the stand between the spreader arms and the sinker weight. Means for mounting a fishing hook are provided adjacent the free end of each of the spreader arms and a retainer member or bead is slidably mounted adjacent the upper end of the stand for holding the spreader arms parallel to and closely adjacent the stand when the spreader arms are in their storage position.

In one embodiment, the sinker weight is removable and the spreader assembly is reversible.

BRIEF DESCRIPTION OF THE DRAWINGS

FIG. 1 is a diagrammatic view, partially in cross section, showing a fishing spreader assembly according to the present invention and showing in dashed lines the removal of a hook from one of the spreader arms;

FIG. 2 is a view of the fishing spreader assembly shown in FIG. 1 in its storage position;

FIG. 3 is a view similar to FIG. 1 of another embodiment of a fishing spreader assembly according to the present invention;

FIG. 4 is a view of the fishing spreader assembly shown in FIG. 3 with the sinker weight removed and the spreader assembly reversed so that the hooks are positioned adjacent the surface of a body of water;

FIG. 5 is a view of the fishing spreader assembly shown in FIG. 3, showing the fishing assembly in its storage position; and FIG. 6 is a diagrammatic view showing a hook weld directly to the outer end of a spreader arm.

DESCRIPTION OF THE PREFERRED EMBODIMENTS

Referring to FIGS. 1 and 2, a fishing spreader assembly, according to the present invention is generally indicated by the reference number 10. The spreader assembly 10 includes a longitudinally extending metal stand 11 having an upper end 12 and a lower end 13. The metal stand 11 is relatively stiff. A pair of oppositely disposed flexible spreader arms 14 and 15 are mounted adjacent the upper end 12 of the stand 11. The spreader arms 14 and 15 each have first ends 16 which are connected to the metal stand 11 by a clamping sleeve 17. The spreader arms 14 and 15 also include second ends 18 which in the present embodiment are bent to define loops 19.

In the present embodiment, the spreader arms 14 and 15 are constructed of a single piece of flexible wire, defining a line engaging loop 20 adjacent the upper end 12 of the metal stand 11. A sinker weight 21 is attached to the lower end 13 of the stand 11.

A float 22 is freely slidably mounted on the metal stand 11 between the first ends 16 of the spreader arms 14 and 15 and the sinker weight 21. The float 22 is constructed of buoyant material, for examples, rigid polyurethane foam, cork, or wood. A retainer member, for example, bead 23 is slidably mounted adjacent the upper end 12 of the metal stand 11. The retainer bead 23 also receives and slides along the spreader arms 14 and 15 as will be discussed below. In the present embodiment, a fishing line 24 is attached to the loop 20 and individual hooks 25 and 26 are placed on the loops 19 of the second ends 18 of the respective spreader arms 14 and 15. However, if desired the hooks may be welded directly to the out ends of the spreader arms and the loops 19 eliminated (see FIG. 6). Keeper member, for examples, beads 27 are positioned over the free ends of the loops 19 to retain the hooks 25 and 26 on the respective spreader arms 14 and 15.

Referring to FIG. 1, the hook 26 is removed by moving the keeper bead 27 to the position 27a and then sliding the fishing hook away from the loop 19 as shown at 26a.

The fishing spreader assembly 10 is shown in its operative fishing position in FIG. 1. The spreader arms 14 and 15 bias the hooks 25 and 26 outwardly from the metal stand 11. The fisherman lowers his fishing line 24 until the sinker weight 21 has struck the bottom, indicated by the reference number 30 in FIG. 1. However, even though the fishing line 24 is slack, the spreader assembly 10 does not rest completely on the bottom 30. Rather, the float 22 moves upwardly and assumes the position shown in FIG. 1. The buoyancy of the float 22 holds the upper portion of the spreader assembly 10 in position so that the hooks 25 and 26 are above the bottom 30.

FIG. 2 shows the fishing spreader assembly 10 in its storage position. The fishing line 24 has been removed from the loop 20 and the hooks 25 and 26 have been removed from their respective loops 18. The float 22 has been moved downwardly. The bias of the spreader arms 14 and 15 urge them outwardly to the fishing position shown in FIG. 1; however, to move the arms 14 and 15 to the storage position the retainer bead 23 is pushed downwardly to the position shown in FIG. 2. The retainer bead 23 holds the spreader arms 14 and 15 parallel to and closely adjacent the stand 11.

Another embodiment of a fishing spreader assembly, according to the present invention, is generally indicated in FIGS. 3-5 by the reference number 35. The spreader assembly 35 may be utilized to place the hooks adjacent the bottom of a body of water as shown in FIG. 3, or, in the alternative, near the surface of a body of water as shown in FIG. 4. The FIG. 4 surface position is utilized, for example, when fishing in shallows for black bass. The spreader assembly 35 is cast into the shallows and the baited hooks are prepositioned a relatively short distance below the surface of the water.

The spreader assembly 35 includes a metal stand 11a having an upper end 12a and a lower end 13a. Flexible spreader arms 14a and 15a are connected adjacent the upper end 12a of the metal stand 11a by a clamping sleeve 17a. Loops 36 and 37 are formed at the outer ends of the spreader arms 14a and 15a, respectively. Slidable keeper member, for examples, beads 38 and 39 are positioned adjacent the loops 36 and 37.

A clasp loop 40 is formed at the lower end of the stand 11a. When the spreader assembly 35 is in the FIG. 3 position, the clasp loop 40 is compressed and removably mounts a sinker weight 41.

A freely slidable buoyant float 22a is positioned between the clasp loop 40 and the upper end 12a of the stand 11a. A retainer member, for example, a bead 23a is mounted on the upper end 12a above the innermost ends of the spreader arms 14a and 15a.

In the present embodiment, a coil 42 is formed at the upper end 12a of the stand 11a. The coil 42 is spaced from the loops 36 and 37 and serves as attaching means in this embodiment, however, other types of attaching means may be utilized. Snelled hooks 43 and 44 are attached to the coil 42 and extend downwardly through the loops 36 and 37 of the spreader arms 14a and 15a. A fishing line 24a is attached to a loop 20a located adjacent the upper end 12a of the metal stand 11a.

When the fishing spreader assembly 35 is in its operative fishing position shown in FIG. 3, the sinker weight 41 moves downwardly to the bottom 30. As with the first embodiment, the float 22a moves upwardly on the metal stand 11a and the buoyancy of the float 22a keeps the snelled hooks 43 and 44 at a predetermined distance above the bottom 30.

Referring to FIG. 5, when the fisherman desires to place the spreader assembly 35 in its storage position, the retainer bead 23a is moved downwardly, thereby holding the spreader arms 14a and 15a in a generally parallel relationship with respect to the stand 11a. When in this storage position, the spreader assembly 35 may be placed in a tackle box.

When the fisherman desires to fish close to the surface of the body of water (indicated by the reference number 45 in FIG. 4), he removes the sinker weight 41 from the clasp loop 40. The clasp loop 40 expands and serves as a means for attaching the fishing line 24a to the spreader assembly 35. When in the FIG. 4 position, the spreader assembly 35 has been rotated 180° with respect to its FIG. 3 position. The float 22a moves along the metal stand 11a until it engages the clasp loop 40. The buoyancy of the float 22a insures that the snelled hooks 43 and 44 are in their proper position below the surface 45.

What I claim is:

1. A fishing spreader assembly comprising, in combination, a longitudinally extending metal stand having upper and lower ends, a pair of oppositely disposed flexible spreader arms, each of said spreader arms having a first end and a second end, said first end mounted on said upper end of said stand, said spreader arms being movable between a fishing position and a storage position, a sinker weight mounted adjacent the lower end of said stand, a float freely slidably and independently mounted on said stand between said first ends of said spreader arms and said sinker weight, whereby said float is free to slide along the length of said metal stand between said spreader arms and a point adjacent said lower end of said stand above said sinker weight, hook means for mounting a fishing hook adjacent said second end of each of said spreader arms, said hook means including a loop at said second end of each of said spreader arms, a keeper member adjacent each of said loops, a pair of snelled hooks, each having a leader portion received and extending through a respective one of said loops, attaching means spaced from each of said loops for removably attaching said leaders to said spreader assembly, and a retainer member slidably mounted on said upper end of said stand for holding said spreader arms parallel to and closely adjacent said stand when said spreader arms are in the storage position.

2. A fishing spreader assembly according to claim 1, wherein said float is constructed of rigid polyurethane foam.

3. A fishing spreader assembly according to claim 1, including a loop at said upper end of said stand for receiving a fishing line.

4. A fishing spreader assembly according to claim 1, wherein said sinker weight is removably mounted on said stand and including means for attaching a fish line adjacent said lower end of said stand.

5. A fishing spreader assembly according to claim 1 wherein said keeper member comprises a keeper bead.

6. A fishing spreader assembly according to claim 1 wherein said retainer member comprises a retainer bead.

7. A fishing spreader assembly according to claim 1 wherein said attaching means comprises a coil mounted adjacent said upper end of said stand.

* * * * *